United States Patent Office 3,522,177
Patented July 28, 1970

3,522,177
AQUEOUS LUBRICANT COMPOSITION
John W. Benz, Prospectville, Pa., assignor to Standard Pressed Steel Co., Jenkintown, Pa., a corporation of Pennsylvania
No Drawing. Filed Dec. 26, 1967, Ser. No. 693,183
Int. Cl. C10m 3/34, 3/06, 3/02
U.S. Cl. 252—23                                    3 Claims

ABSTRACT OF THE DISCLOSURE

Aqueous compositions, useful per se as lubricants and for forming dry lubricating films, comprising a finely divided solid lubricant suspended in an aqueous solution of an alkali metal silicate and an alkali metal lignosulfonate. Methods for making such compositions and for coating metal fasteners therewith. Metal fasteners lubricated with such compositions.

The present invention relates to stable aqueous lubricating compositions adaptable to the formation of dry lubricating films, to methods of making such stable compositions, to fasteners lubricated with such lubricating compositions, and to methods of lubricating fasteners with the compositions.

U.S. Pat 3,079,204 to Lamson et al. discloses bearing structures including a dry lubricating film bonded thereto. The film includes a solid lubricant such as molybdenum disulfide, with or without additional graphite, and a bonding agent comprising a dried water-soluble metal silicate.

Although these prior art compositions form useful lubricating films as taught in the aforementioned patent, the aqueous compositions from which the films are formed have certain disadvantages. The aqueous solid lubricant dispersions of the prior art are unstable, that is the particles contained therein tend to aggregate and form clumps, and eventually to settle from the dispersion. The formation of aggregates increases the viscosity of the prior art dispersions making difficult their application to surfaces to be lubricated. Because of the viscosity limitations and the necessity for constant agitation to keep the suspended particles in a suspended phase, the compositions per se have little utility as liquid aqueous lubricants, but are restricted to uses in which a dry lubricating film is formed.

According to the present invention, improved aqueous compositions of this type have been prepared by the incorporation of water-soluble alkali metal lignosulfonates into aqueous dispersions of a solid lubricant containing a water-soluble alkali metal silicate as a binder. The presence of the lignosulfonate salt increases the stability of such dispersions, reducing the tendency to formation of aggregates and clumps and inhibiting settling of solids therefrom. The viscosity of the aqueous compositions is dramatically reduced so that the aqueous compositions per se acquire utility as fluid lubricants in addition to their usefulness in forming dry lubricating films. The increased ease of application made possible by the properties of the new compositions makes them of particular utility as lubricants for metal fasteners such as nuts, bolts, screws, and the like. The compositions can be used with such fasteners to form liquid lubricating coatings or dry lubricating films thereon.

The compositions of the present invention are particularly economical because they permit the inclusion therein of solid lubricant fines of a particle size not heretofore considered suitable in the art for the preparation of lubricating coatings. Because these fines are ordinarily rejected in the prior art for lubricating applications, they are of particularly low cost. These fines can be suitably included in the compositions of the present invention for forming fluid or dry lubricating coatings on metal fasteners in a manner which is particularly attractive economically.

In general, the aqueous dispersant phase of the lubricating compositions according to the present invention comprise from about 30–40 parts by weight of water, about 30–40 parts by weight of an alkali metal silicate, preferably a silicate of sodium or potassium, and from 0.25 to 5 parts by weight of an alkali metal lignosulfonate such as a potassium or sodium lignosulfonate. This phase is used to suspend about 25–35 parts by weight of a solid lubricant. The compositions optionally may contain wetting agents to aid in the dispersion of the solid lubricant particles. A preferred composition contains about 35 parts by weight of water, about 35 parts by weight of an alkali metal silicate (solids), about 30 parts by weight of dry film lubricant, about 0.5 part by weight of an alkali metal lignosulfonate, and about 0.1 part by weight of a wetting agent.

The alkali metal silicates employed as binders according to the present invention are materials like those taught in the aforementioned Lamson et al. patent. These silicates are commercially available as aqueous solutions of various concentrations in which the ratio of silicate to alkali metal oxide is also variable.

The solid lubricants principally employed according to the present invention are molybdenum sulfide and graphite, alone or in combination. However, other known solid lubricating agents can also be used according to the present invention, alone or in combination, to form aqueous lubricating compositions suitable for forming liquid or dry lubricating films on fasteners. Such solid lubricants include materials such as red lead, tungsten sulfide and tungsten selenide, niobium disulfide, and the like. Molybdenum sulfide is a fairly readily available solid lubricant which is particularly adaptable to use in formulating the compositions of the present invention. Graphite is preferred as the lubricant if the articles, such as fasteners, coated with the compositions are to be employed at high temperatures.

As mentioned earlier, the particle sizes of these suspended solid lubricants may be much smaller in the compositions of the present invention than conventionally thought suitable in the art for forming dry lubricating films. Commonly, in the prior art, coarse particles between about 5 and 10 microns in average diameter are selected for lubricant uses, and finer particle sizes are discarded. In the present invention, suitable compositions are commonly prepared using solid lubricant particle sizes less than 1 micron, i.e. the so-called "sub-sieve" sizes. Generally, the particle sizes vary from about 0.5 micron to 1 micron, and a particularly preferred average particle size for both molybdenum disulfide and graphite is about 0.7 micron.

The alkali metal lignosulfonates contained within these compositions are known in the art and are commercially available, for example under the tradename "Marasperse." Although the materials are well-known in the art, their structure is complex and is not exactly known. In general, the materials are produced from softwood spent sulfite liquors and are highly refined, anionic, de-sugared products.

Wetting agents, when additionally present in the compositions of the present invention, aid in the stable dispersion of the lubricant particles and, particularly, facilitate the manufacture of the compositions. A wide variety of such wetting agents is commercially available. A preferred group of materials are alkoxylated alkyl phenols, particularly ethoxylated materials like those commercially available under the tradenames "Triton" and "Tergitol."

The manner in which the aqueous lubricating compositions of the present invention are formulated is critical to their stability. It is extremely difficult to suspend the finely-divided solid lubricant particles and to keep them in suspension. The order in which the various components of the composition are formulated has a very significant effect on the properties of the resulting dispersion. Generally, the water and any wetting agent employed are first combined. To this mixture is added the alkali metal lignosulfonate, followed by the finely-divided solid lubricant particles. After the particles have been thoroughly dispersed throughout the aqueous dispersing phase to form a stable dispersion, the alkali metal silicate binder may be added to prepare the final product.

The resulting liquid compositions can be used per se as a lubricant, for example by application in liquid form to a metal fastener immediately prior to employment of the fastener, e.g. immediately prior to engaging a nut and bolt for fastening purposes. In the alternative, they may be used to coat metal fasteners such as nuts and bolts, followed by drying of the composition to remove water and to form a solid adherent dry lubricating film on the metal parts.

The aqueous liquid compositions of the invention can be applied to a surface, such as that of a fastener, by coating, spraying, dipping, or other conventional methods. If the fastener is not immediately employed with the liquid lubricating film thereon, it may be dried, suitably by air-drying. This air-drying may be followed by an oven curing to render the silicate binder within the film water-insoluble. Oven-curing is generally carried out by heating the coated parts at temperatures below about 200° F., e.g. about 150° F., for two or more hours, followed by heating at 400°–500° F. for about 2 hours. The slow drying to permit gradual evaporation of moisture from the coatings insures the formation of smooth-bubble-free and pock-free lubricant films.

Dried lubricating films of this type are suitably present on fasteners in a thickness of from about 0.2 to about 0.6 mil, but this value is not critical and films up to 2 mils thick can be formed. In general, when objects such as fasteners are coated with a lubricating film by dipping, the compositions of the present invention produce thinner films than are formed using prior art dispersions of a solid lubricant. Such thin films are of particular utility on titanium fasteners, where their presence prevents galling and seizing.

A better understanding of the present invention will be had by referring to the following specific examples, given by way of illustration.

EXAMPLE 1

A suspension of molybdenum disulfide was prepared by adding 0.1 part by weight of a polyethoxylated alkyl phenol wetting agent ("Triton X-100") to 34.4 parts of water. 0.5 part of sodium lignosulfonate ("Marasperse N-22") were added, followed by 30 parts of molybdenum disulfide technical fines. Finally, an aqueous solution of sodium silicate containing 35 parts by weight of solids ("Diamond Alkali Grade 47") was combined with the dispersion. The silicate solution had a concentration of about 43 percent, and a density of 1.48 grams/cc. The $SiO_2/Na_2O$ ratio was 2.84/1.

The resulting suspension was used to coat metal fasteners (bolts) by dipping. Some bolts were used while the lubricant coating was still liquid. Others were air-dried and then heated first at 150° F. and then at 450° F. to drive off water and to insolubilize the adherent molybdenum disulfide coating.

EXAMPLE 2

0.75 part by weight of polyethoxylated alkyl phenol ("Triton X-100" was added to 275 parts of water, followed by 3.5 parts of sodium lignosulfonate and 176 parts of graphite powder having an average particle size of 0.62 micron. Finally, an aqueous solution of sodium silicate (density=1.36 grams/cc.; $SiO_2/Na_2O$=3.21/1) was added to introduce 245 parts by weight of solid silicate.

The solution was used to coat fasteners by dipping.

Similar compositions can be made including red lead, tungsten sulfide or selenide, or mixed solid lubricants such as mixtures of graphite and molybdenum disulfide.

What is claimed is:

1. A stable aqueous lubricating composition adaptable to the formation of dry lubricating films comprising an aqueous solution of an alkali metal silicate and of an alkali metal lignosulfonate as a dispersing phase and a finely divided dry film lubricant as a dispersed phase.

2. A composition as in claim 1 wherein said finely divided dry film lubricant is selected from the group consisting of molybdenum disulfide and graphite.

3. A composition as in claim 1 wherein said finely divided dry film lubricant has an average particle size less than about 1 micron.

References Cited

UNITED STATES PATENTS

| | | | |
|---|---|---|---|
| 2,854,444 | 9/1958 | Monson et al. | 252—353 |
| 3,079,204 | 2/1963 | Lamson et al. | 252—28 |
| 3,249,537 | 5/1966 | Morway et al. | 252—33 |
| 3,377,278 | 4/1968 | Ruzza | 252—21 |
| 3,425,953 | 2/1969 | Cowan et al. | 252—33 |

DANIEL E. WYMAN, Primary Examiner

I. VAUGHN, Assistant Examiner

U.S. Cl. X.R.

85—1; 117—127; 252—21, 33, 49.5, 353